Oct. 23, 1928.
J. T. BEECHLYN
1,689,102
ANIMATED PICTURE DISPLAY
Filed Sept. 18, 1924    3 Sheets-Sheet 1
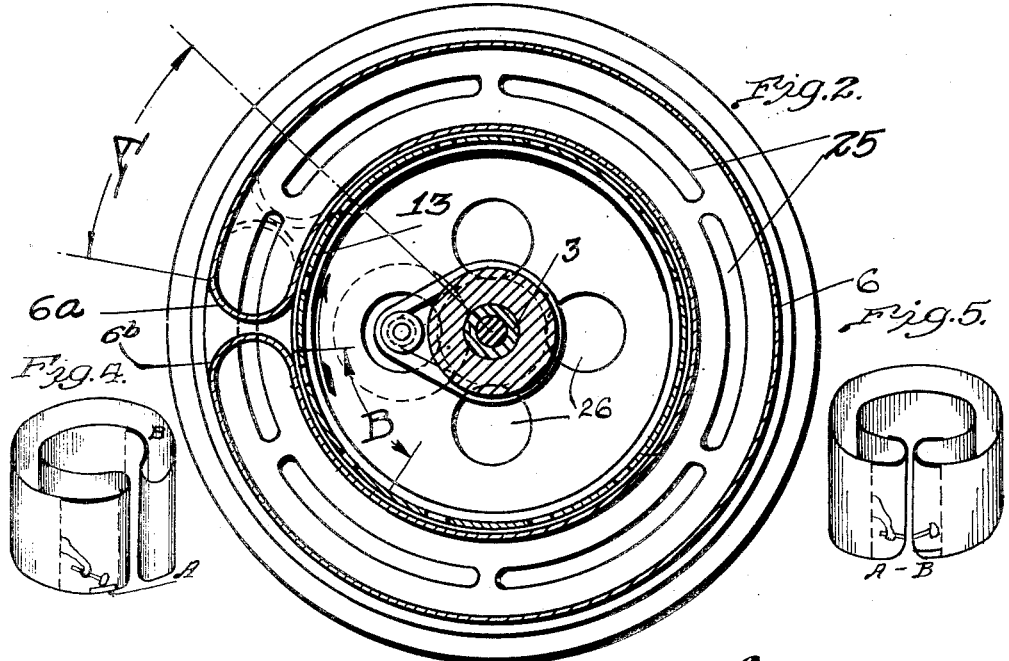
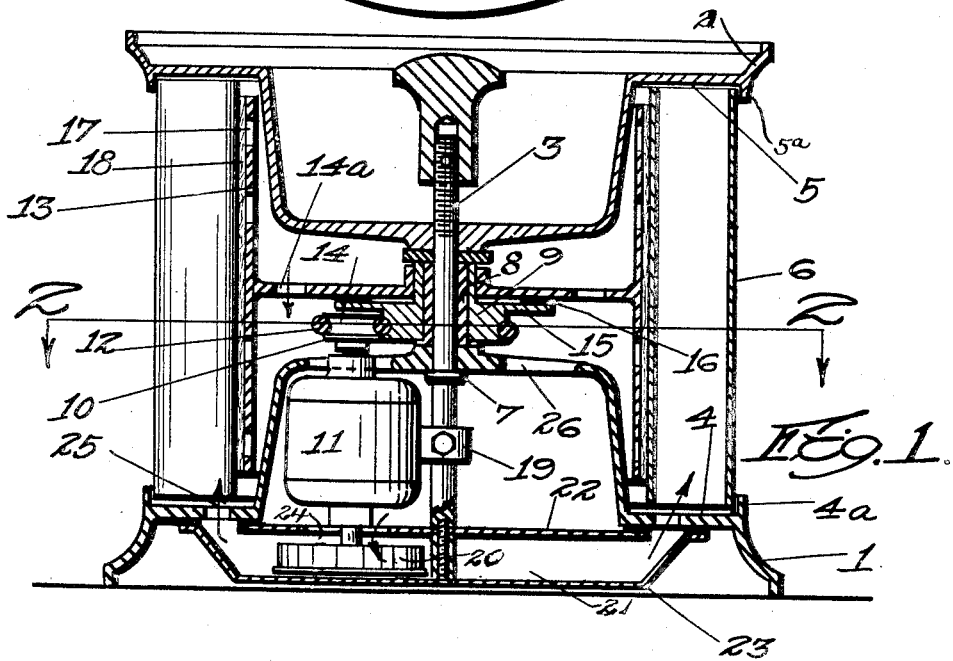
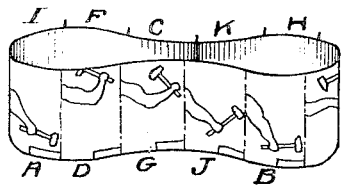
Inventor:
John T. Beechlyn
By Attorney
Owen W. Kennedy Oct. 23, 1928.
J. T. BEECHLYN
1,689,102
ANIMATED PICTURE DISPLAY
Filed Sept. 18, 1924   3 Sheets-Sheet 2
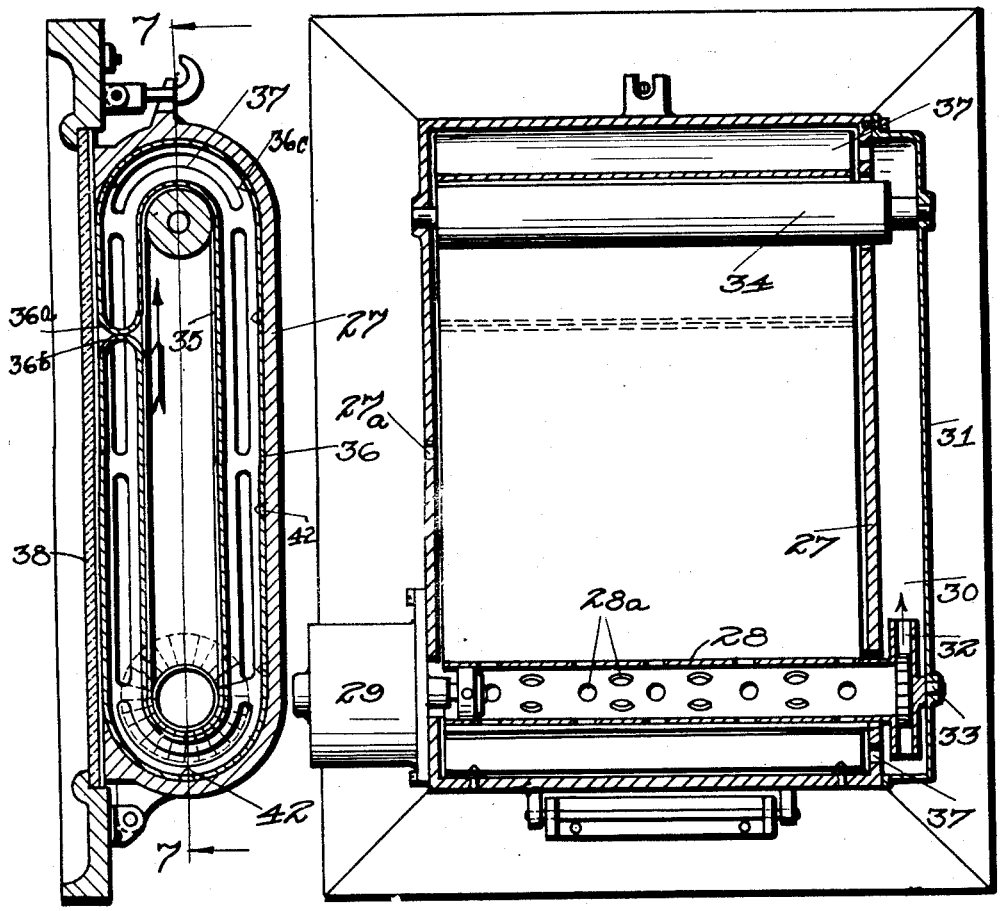
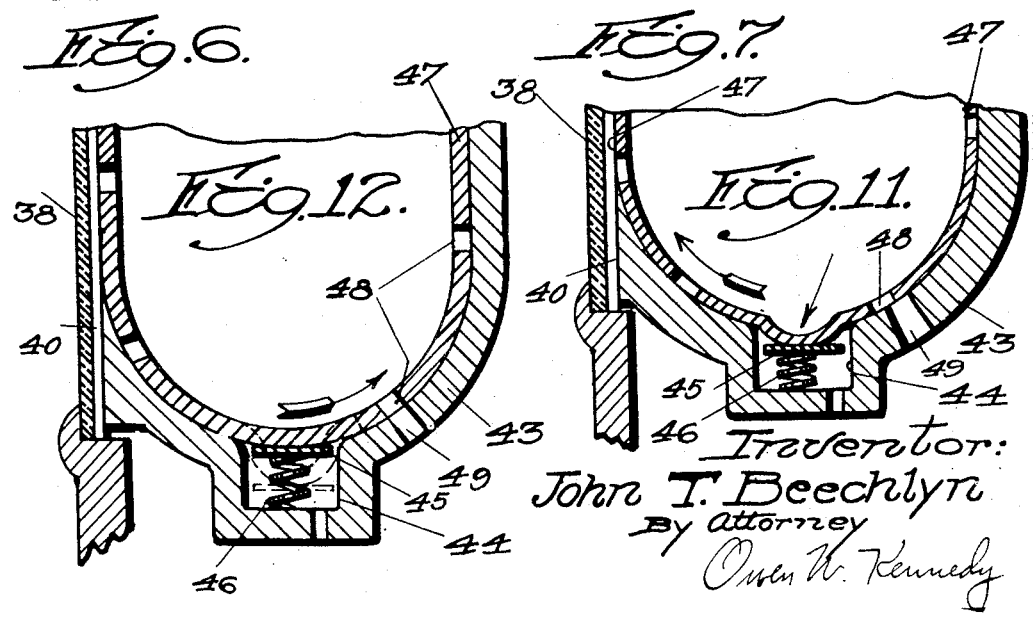
Inventor:
John T. Beechlyn
By Attorney
Owen W. Kennedy Oct. 23, 1928.
J. T. BEECHLYN
1,689,102
ANIMATED PICTURE DISPLAY
Filed Sept. 18, 1924  3 Sheets-Sheet 3
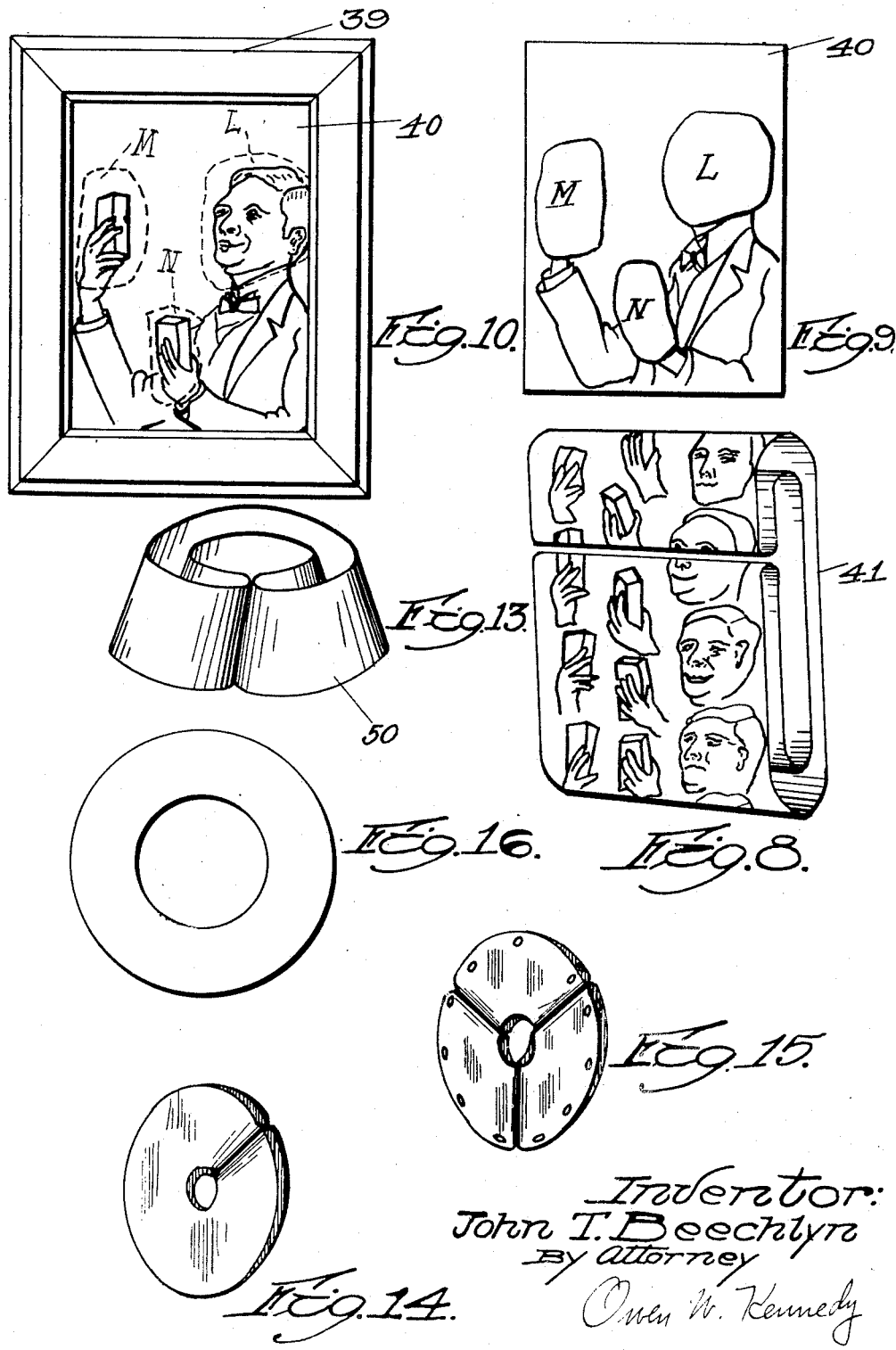

Patented Oct. 23, 1928.

1,689,102

UNITED STATES PATENT OFFICE.

JOHN T. BEECHLYN, OF WORCESTER, MASSACHUSETTS, ASSIGNOR, BY MESNE ASSIGNMENTS, TO HAPTOGRAPH, INC., A CORPORATION OF MASSACHUSETTS.

ANIMATED PICTURE DISPLAY.

Application filed September 18, 1924. Serial No. 738,483.

My invention relates to the display of pictures or other graphic representations to direct view in such a manner that the subject portrayed appears to be in motion.

In my Patent No. 1,591,737, issued July 6, 1926, there is shown and described a method of and device for animated picture display which contemplates the employment of an endless carrier having a series of pictures thereon showing successive phases of an action and means for supporting the carrier with portions of pictures showing successive phases of the action in complementary relation, the effect of apparent motion being obtained by shifting along the carrier the zone of mergence between the complementary portions of successive pictures. In the operation of the display device described in the above mentioned application, the band carrying the pictures is directly viewed by the observer and during the period of transition between different pictures of a series, that is to say, while one picture is being withdrawn from view and the next picture substituted for it, the pictures appear to fade into each other without intermittent movement and without appreciable blurring or flickering.

The object of the present invention is to provide improved means for supporting the picture band and presenting it to view, the transition between different pictures of a series which gives the impression of motion to the observer, taking place in substantially the same manner as descrbed in my above mentioned copending application. The present invention contemplates the support of the picture band in such a manner that sliding frictional engagement of the band during the operation of the device, will be substantially eliminated, thereby insuring the smooth and uniform operation of the device and permitting the employment of light weight material for the band without necessitating the frequent replacement of the band, due to wear. My invention further contemplates improved means for carrying out the display of a picture or other graphic representation in which only a portion of the total area of the picture appears to have motion. The above and other advantageous features of my invention will hereinafter more fully appear, reference being had to the accompanying drawings in which, Fig. 1 is a view partially in section and partially in side elevation of my improved device for presenting the picture band.

Fig. 2 is a horizontal sectional view along the line 2—2 of Fig. 1, looking in the direction of the arrows.

Fig. 3 is a perspective view of a picture band for use in connection with the device shown in Fig. 1.

Figs. 4 and 5 are diagrammatic views illustrating the appearance of the band for a given phase of operation of the device shown in Fig. 1.

Fig. 6 is a vertical sectional view illustrating a modified form of device for presenting the picture band.

Fig. 7 is a sectional view along the line 7—7 of Fig. 6, looking in the direction of the arrows.

Fig. 8 is a perspective view of a picture band suitable for use in connection with the device shown in Fig. 6.

Fig. 9 is a front view of a picture or other graphic representation particularly adapted for use in connection with the picture band shown in Fig. 8.

Fig. 10 is a front view of the device shown in Fig. 6, illustrating the appearance of the band shown in Fig. 8 when viewed simultaneously with the picture shown in Fig. 9.

Fig. 11 is a fragmentary view of a portion of a device similar to the device shown in Fig. 6 and illustrating improved means for insuring proper cooperation between the band shown in Fig. 8 and the picture shown in Fig. 9.

Fig. 12 is a view illustrating the functioning of the parts shown in Fig. 11.

Figs. 13, 14 and 15 are perspective views showing modified forms of bands for carrying out my invention.

Fig. 16 is a plan view of the band shown in Fig. 13 developed in flat form.

Like reference characters refer to like parts in the different figures.

Referring first to Figs. 1 and 2, one form of my device consists generally of opposed cup-shaped members 1 and 2 mounted in spaced relation on a centrally located stud 3, whereby annular surfaces 4 and 5 of the members 1 and 2 respectively, are maintained in substantial parallelism a predetermined distance apart. The distance between the surfaces 4 and 5 is slightly more than the width of an endless picture band 6, and the surfaces 4 and 5 are bounded by opposed annular flanges 4ª and 5ª respectively, with which the edges of the picture carrying band 6 are adapted to be maintained in contact by means which will now be described.

For convenience of assembly, the stud 3 is provided with a shoulder 7, upon which rests the hub of the member 1, and the upper portion of the stud is threaded to receive the hub of the member 2, a suitable sleeve 8 being provided to space the members 1 and 2 the desired distance apart. A pulley 9 loosely surrounds the sleeve 8 and is adapted to be driven from a pulley 10 carried by a motor 11 by means of a belt 12. A hollow cylindrical drum 13 open at both ends is provided with a central web 14 which is supported by a flange 15 of the pulley 9, and a ring of frictional material 16 is interposed between the web 14 and the flange 15, whereby rotation of the pulley 9 will tend to cause the drum 13 to rotate therewith. The drum 13 is provided with a number of perforations 17 and its outer periphery is covered with a soft frictional material 18, preferably of a porous nature, for a purpose to be hereinafter described.

The motor 11 is supported from the stud 3 by means of a suitable bracket 19, and the lower end of its shaft carries a blower or fan element 20 which is located in the chamber 21 included between plates 22 and 23 carried by the stud 3, the edges of the plates 22 and 23 preferably making a tight fit with the lower surface of the portion 4 of the member 1. The fan or blower element 20 may be of any desired type, and when driven by the motor 11, is adapted to draw air into the chamber 21 through an opening 24 in the plate 22 and thereby tends to build up a pressure therein. The annular portion 4 is provided with a number of slots 25, so that when the fan is driven, air under pressure is adapted to be delivered into the space between the drum 13 and that portion of the band 6 which is shown as being in engagement with the flanges 4ª and 5ª. It will be noted that the web 14 is provided with openings 14ª and also that the central portion of the member 1 is provided with a series of openings 26, through one of which the upper portion of the shaft of motor 11 carrying the pulley 10, projects. Consequently when the fan 20 is driven by the motor 11, a suction will be created inside the drum 13, while a pressure will be maintained outside the drum within the folds of the band 6. As a result, the band 6 tends to cling to both the flanges 4ª and 5ª and also to the outer periphery of the drum 13. Since the band is made of fairly stiff material and is already curved in one plane, it is able to withstand the pressure generated by the fan without bending or buckling between the flanges 4ª and 5ª. It has been found that very thin material may be employed for the band and the necessary support between the members 1 and 2 provided by transparent material confining the band, or by the use of a number of supporting elements, such as wires extending between the members 1 and 2. The fact that the drum 13 is provided with perforations 17 and is covered with porous frictional material 18, insures that the inner fold of the band 6 will closely engage the drum because of the fact that the difference in air pressure is greatest between the band and the interior of the drum 13.

It is apparent from Fig. 2, that when the motor 4 is operating, the closed loop presented by a band of proper length will be maintained in annular form with the turned end portions 6ª and 6ᵇ of the loop disposed closely adjacent to each other without actually touching. Assuming that the drum 13 is driven by the motor 11 in the direction of the arrow in Fig. 2, it is obvious that as the drum 13 rotates, it will draw onto its outer periphery that portion of the band adjacent to the turned portion 6ª, thereby angularly shifting the end 6ª of the loop in the direction of the arrow. At the same time, however, the band will leave the drum 13 adjacent the turned portion 6ᵇ, with the result that the portion 6ᵇ will follow the portion 6ª. It is obvious that this action will continue as the drum rotates, so that the portions 6ª and 6ᵇ will progress around the entire periphery of the drum 13, the band 6 at all times being maintained in the form shown in Fig. 2, by the air pressure in the annular space between the outer and inner portions of the loop, that part of the loop in contact with the flanges 4ª and 5ª being stationary, while that part carried on the drum 13 is moved at a considerable speed.

The above described progressive withdrawal of the band 6 from direct view, and its progressive replacement by other portions of the band, is based on the same principle as the corresponding movements of the band described in my Patent Number 1,591,637. In order to simplify the description of the operation of the present device in giving the appearance of motion to a series of pictures, the band 6 is shown in Fig. 3 as having been removed from the device and spread out, the band being provided with a series of pictures similar to the pictures presented by the band described in my copending application. The series of pictures on the band 6 represent the arm of a man in the act of striking an anvil with a hammer, the successive phases of the action being lettered A to K inclusive. The pictures are arranged in the order shown and described in my copending application, so that when the band 6 is employed with the device shown in Fig. 2, it is possible to have the picture A fully visible while that portion of the band carrying the picture B is on the drum, as diagrammatically indicated in Fig. 4. If the drum 13 is then turned in the direction of the arrow, it is obvious that the portion of the band carrying the picture A will be withdrawn from view onto the drum, while that portion carrying the picture B will be presented to view as it leaves the drum. Assuming that the movement of the drum has been such as to bring the band portions $6^a$ and $6^b$ into the dotted line position of Fig. 2, it is apparent that the peripheral space between the dot and dash lines originally occupied by the picture A, in Fig. 4, will then be occupied by complementary portions of the pictures A and B, as illustrated diagrammatically in Fig. 5. It is apparent that as portions of one picture disappear from view corresponding portions of the other picture will appear, so that at any time during this transition a complete picture, except for the narrow space between the portions $6^a$ and $6^b$, is formed by the visible parts of both pictures taken together. Consequently the picture A will appear to change to the picture B without having apparently been withdrawn from the view of the observer, all as clearly set forth in my above described copending application.

It is apparent that as the drum 13 rotates to bring about the above described substitution of one picture for another, the band 6 will at all times be maintained in the annular form shown in Fig. 2 by the difference in air pressure on opposite sides of both the inner and outer portions of the band. The operation of my device results in little or no wear of the band by reason of the fact that it is solely in rolling engagement with its supporting surfaces, the band passing easily onto, or off of the drum 13, or the flanges $4^a$ and $5^a$, while the shifting of the turned portions $6^a$ and $6^b$ is accomplished without actually bending the band over an edge to give it the desired form. The air pressure acting on the band results in the progression of the portions $6^a$ and $6^b$ without appreciable wear on the band, or any appreciable tendency to pull it. The fact that the difference in air pressure on opposite sides of the drum 13 is greater than the difference in air pressure on opposite sides of the outer portion of the band results in the band clinging closely to the drum 13 in spite of any centrifugal tendency, thereby insuring the smooth and uniform operation of the device, with the practical absence of noise and shock and with but a slight expenditure of power. In practice, it has been found that the air pressure may be varied through a considerable range between that pressure which will just maintain the band in proper form and that pressure which will finally cause failure or buckling of the band between the flanges $4^a$ and $5^a$; a satisfactory pressure being ordinarily only a fractional part of an ounce per square inch of band area.

In the foregoing description, my present invention has been described as embodying the elementary form of the invention described in my aforesaid Patent No. 1,591,737, that is to say, the device shown in Figs. 1 and 2 is adapted for presenting the picture band to view in substantially circular form. Referring now to Figs. 6 and 7, there is shown, for example, a device for presenting the picture band to view in a different form, namely, with that portion of the picture band exposed to direct view, presented as a substantially plane surface, it being understood, however, that the device shown in Figs. 6 and 7 has the same underlying principle of operation as the device shown in Figs. 1 and 2.

As best shown in Fig. 6, the modified device consists of a casing 27, generally oval in form, within which is rotatably supported a hollow cylindrical drum 28. One end of the drum 28 is carried by the shaft of an electric motor 29, while the other end thereof is extended beyond the casing 27 into a chamber 30 formed by a hood 31 secured to the casing 27. A number of vanes 32 extend radially from the drum 28, whereby rotation of the drum 28 by the motor 29 is adapted to cause air to be discharged into the chamber 30 from the interior of the drum 28, air entering the drum through perforations $28^a$ and a port $27^a$ provided in the end wall of the casing 27. The drum 28 is rotatably supported beyond the vanes 32 by a stud 33 journalled in the hood 31.

A roll 34 is rotatably supported at the upper end of the casing 27, and as best shown in Fig. 6, an endless belt 35 of frictional porous material extends between the drum 28 and the roll 34, whereby the belt 35 will be moved when the motor 29 is operated. An endless picture band 36 is disposed in the space between the belt 35 and the walls of the casing 27, and the band 36 is caused to cling to the surface of the belt 35 and the inner surfaces of the casing 27 by the admission of air under pressure from the chamber 30 through suitable slots 37. The length of the picture band 36 is such that when the loop is fully extended, its turned end portions $36^a$ and $36^b$ will be closely adjacent to each other without actually being in engagement. The fact that air is delivered under pressure to the chamber 30 insures that the picture band 36 will cling closely to the belt 35. Consequently when the latter is moved in the direction of the arrow by operation of the motor 29, the picture band adjacent the portion $36^a$ will be drawn onto the belt 35, thereby shifting the portion $36^a$ in the direction of the arrow, while the portion $36^b$ will follow the portion 36ª by reason of the fact that the picture band will leave the belt 35 at the same rate that it is drawn onto the belt.

It is therefore apparent that with the arrangement shown in Figs. 6 and 7, the portions 36ª and 36ᵇ will be simultaneously shifted around the perimeter of the belt 35 in substantially the same manner that the portions 6ª and 6ᵇ of the band 6 are shifted around the perimeter of the drum 13. This being so, it is obvious that the belt 35 can be provided with a series of pictures so arranged as to give the impression of movement when viewed through the transparent plate 38 at the front of the casing 27. With such a series of pictures on the band 36, the transitions between the successive phases of the depicted action will take place in substantially the same manner as described with reference to Figs. 1 and 2, the difference being that the pictures, or other graphic representations, are displayed to view in the form of a plane surface rather than a curved surface.

In the foregoing description and discussion of both the present invention and the invention set forth in my copending application, Serial No. 602,146, it has been considered for the sake of simplicity of description, that the action portrayed in the pictures more or less affects the whole figure or other object exposed to the view of the observer, so that each phase of the action requires the reproduction of the whole subject portrayed. It is obvious, however, that the action may be confined to a relatively small portion or limited areas of the subject, and in Figs. 8, 9 and 10 I have illustrated a further development of my invention by which the necessity for reproduction of the entire subject for each phase of a limited action is eliminated.

Referring to Fig. 10, there is shown the front elevation of the frame 39 which carries the casing 27 and the plate 38, and in this embodiment of the invention the frame also encloses a mask 40, which as best shown in Fig. 9, has drawn thereon a portrayal, such as for instance a portion of the figure of a man. When the mask 40 is viewed separately, without reference to the rest of the device, the figure portrayed is incomplete, in that certain portions thereof are cut out, as indicated at L, M and N, these cut out portions, for example, being shown as representing the areas which ordinarily include the face and two hands of the person portrayed. The boundaries of the cut out portions L, M and N are indicated in dotted lines in Fig. 10, in which the figure is shown complete, the portions missing in Fig. 9 being supplied by figures, or portions of figures appearing on the picture band 41, which is shown in perspective in Fig. 8.

The picture band 41 is illustrated as being presented in substantially the same form that the band 36 is presented in Fig. 6, and it is obvious that the band 41 carries the portions needed to complete the blank areas L, M and N of the picture drawn on the mask 40. It is further apparent from an inspection of Fig. 8 that the fragmentary showings of the face and two hands of the person generally portrayed on the mask 40, are adapted to show different actions of the features and hands, and are arranged in a predetermined sequence, which is governed by the principles underlying the arrangement of the figures shown in my copending application and in Fig. 3. In other words, the facial features and the hands of the person portrayed on the mask are adapted to display an action when the band 41 is operated by the device shown in Fig. 6, the transition between various phases of the action taking place in the direct view of the observer, but without the observer being aware of the fact that certain portions of the picture before him are being withdrawn and others substituted therefor. With this arrangement, it is obvious that the necessity of reproducing the entire subject for each different phase of the action is eliminated, it being necessary to depict on the band 41 only those portions, or areas, of the subject which are involved in the action portrayed, thereby permitting the use of a relatively short band.

In the circular form of the device shown in Fig. 1, the pictures to be viewed are disposed around the cylinder with no definite relation to any fixed object. For this reason, a slight discrepancy in the ratio of relative lengths of the band and the periphery of the flanges 4ᵃ and 5ᵃ may produce a slight precession or recession of the pictures around the cylinder without this, in general, being objectionable. With the device shown in Figs. 6 and 7, however, and especially where a mask is employed, it is very important to maintain a correct alinement of the complementary picture elements. For this reason, the length of the periphery of the casing must be an exact multiple of picture widths, and to positively insure alinement, pins 42, shown in Fig. 6, are employed which may be spaced apart the exact width of a picture and cooperate with perforations 36ᶜ similarly spaced in the band 36. In Figs. 11 and 12 is shown another means for automatically maintaining registration of the picture elements, by which mechanical strains on the band are eliminated. This arrangement is based upon means for varying the effective length of the supporting surface of the casing in accordance with the requirements for registration.

Referring to Fig. 11, the casing 43, only a portion of which is shown, is provided with a depression 44 within which is loosely received a plate 45 supported by a spring 46 seated in the depression 44. The spring 46 tends to force the plate 45 out of the depression 44, but is prevented from so doing by the presence of the picture band 47 which is maintained in expanded condition against the inner surface of the casing 43 by air pressure, in substantially the same manner as the band 36 is maintained in an expanded condition. The band 47 is made of such length that when it is fully expanded in the form of a flat loop within the casing 43, that portion of the band 47 which is in engagement with the plate 45, tends to force the plate 45 within the depression 44 against the pressure of the spring 46, the air pressure within the closed loop of the band then being sufficient to just overcome the force of the spring 46. In other words, the band 47 is made slightly longer than is necessary to completely fill the casing 43 when it is fully expanded, the extra length of band being taken care of by the inward yielding of that portion of the inner surface of the casing 43 represented by the plate 45.

From a consideration of Fig. 11 it is apparent that the amount which the plate 45 is depressed by the band 47 will depend upon the air pressure within the closed loop of the band, and I have provided means for automatically varying the pressure to compensate for any tendency of the band to deviate from the normal operating condition in which the portrayals on the band are in correct register with the mask. To this end the band 47 is provided with a number of perforations 48 which are preferably spaced apart on the band the same distance as the portrayals thereon and one or more slots 49 are provided in the wall of the casing 43. With the parts as shown in Fig. 11, which is the normal condition of operation, a perforation 48 is partially in register with a corresponding slot 49, so that a certain amount of air escapes from the inside of the band to the outside atmosphere with the result that the pressure within the band is just sufficient to cause the band to depress the plate 45 to the extent indicated. As previously pointed out, the length of the band 47 is such that when the plate 45 is depressed to the extent shown in Fig. 11, the pictures on the band are in exact registration with the portrayal on the mask 40, so that when the mask and band are viewed simultaneously, the subject is completely exhibited. It is evident, however, that any precession or recession of the portrayals on the band around the casing will be objectionable and the cooperation between a perforation 48 and a slot 49 in preventing this will now be described.

Let it be assumed that the band 47 exhibits a tendency to advance, that is to say, to creep around the casing 43 in the direction of the arrow in Fig. 11, in which case the perforation 48 will tend to be moved with respect to the slot 49 and thus decrease the area of the opening through which air may escape. When this occurs the pressure within the closed loop of the band will tend to increase and the band will depress the plate 45 and thus, by increasing the effective length of the casing, compensate for the precession of the band without materially affecting those portions of the band in complementary relation with the subject partially portrayed on the mask 40. If, on the other hand, the band 47 exhibits a tendency to recede, then each perforation 48 will tend to come more into register with its corresponding slot 49, thereby increasing the area of the opening through which air may escape from the interior of the band. This has the effect of reducing the pressure so that the plate 45 tends to force the band out of the recess 44 and thus by decreasing the effective length of the casing, compensate for the recession of the band without materially affecting the registration of the pictures on the band with the mask 40.

The functioning of the plate 45 in thus overcoming any tendency towards recession or precession of the band is illustrated on an exaggerated scale in Fig. 12. The full line showing of the plate illustrates its position when functioning to compensate for recession of the band, while the dotted line showing illustrates the position of the plate when functioning to compensate for precession of the band. In the normal operation of my device, the tendency towards recession or precession of the band is very slight, so that the plate 45 is usually depressed to the extent shown in Fig. 11. It is obvious that with the motor 29 operating at a constant speed, the vanes 32 will develop a predetermined amount of pressure within the closed loop of the band, and that this pressure is such as to tend to maintain the band as shown in Fig. 11, that is, with the perforations 48 about half way in complete register with the slots 49, and with the plate 45 partially pushed into the depression 44. It is obvious that the band will tend to remain in a state of equilibrium, for any tendency for the plate 45 to be further depressed will be opposed by the spring 46, while any tendency for the plate to move out of its depression will be opposed by the variable pressure developed within the casing 43.

From the foregoing it is apparent that by the device illustrated in Figs. 11 and 12, it is possible to automatically maintain complete registration between complementary portions of the subject portrayed on the mask 40 and on the band 47 respectively, without the employment of any device, such as coacting pins and perforations, which would tend to wear the band and render it useless. While in the above embodiment of my invention, the casing 43 is provided with a yieldable portion, yet it is obvious that substantially the same results can be obtained by leaving the internal surface of the casing unbroken and interposing a layer of compressible material between the casing and the band, which material would serve to compensate for recession and precession of the band in substantially the same manner as the yieldable plate 45.

While I have shown the picture band as being disposed in generally cylindrical form, it is obvious that other forms of bands may be employed in connection with suitably modified supporting devices, and in Fig. 13 the band 50 is shown as frusto conical in form. If desired, the angle of the cone may be so chosen that the band may be developed out in annular form, as shown in Fig. 16, or in other words, the band shown in Fig. 13 may be laid out on a sheet of suitable material and cut out as a single piece, it being unnecessary to make any joints whatsoever in the band. It is obvious that bands of this type may be printed and cut out with absolute accuracy and the assurance that the successive phases of the action depicted thereon will be in proper relation.

In Fig. 14 there is shown another form of band disposed in the form of a double disk, the opposed annular portions of which are spaced apart with the turned over end portions contiguous, this latter form being readily developable from the form illustrated in Fig. 13. In any of the forms illustrated, the band may be divided into several loops with contiguous end portions, as shown in Fig. 15, or as described in my above mentioned Patent No. 1,591,737.

In addition to the above described modifications of the picture carrier, my invention also contemplates modification of the means for propelling the carrier. For example, I have found that movement of the air by the fan may be relied upon to propel the carrier, the mechanical connection between the motor and the drum, in this event, merely serving to control the speed of the carrier. It is also obvious that other controlling means may be employed in connection with an air propelled carrier.

I claim:

1. In an animated picture display device for presenting to direct view a series of pictures representing successive phases of an action, a flexible endless picture carrier, fluid pressure means acting on the inside of the carrier and means engaging the outside picture bearing surface of said carrier for confining it and determining its form.

2. In an improved picture display device, a flexible picture carrier and fluid pressure means acting directly on the flexible surface of said carrier for presenting the picture bearing surface of said carrier to direct view in a predetermined form.

3. In an improved picture display device, a flexible endless carrier having a series of pictures thereon representing successive phases of an action, and fluid pressure means for presenting said carrier in the form of a flattened loop with the picture flexures at the ends of said loop closely adjacent.

4. In an improved picture display device, a flexible carrier having a series of pictures thereon representing successive phases of an action, fluid pressure means for presenting said carrier in a predetermined form with picture flexures closely adjacent, and means acting on the picture bearing surface of said carrier for propagating the zone of picture flexures across the surface of display.

5. In an animated picture display device for presenting to direct view a series of pictures representing successive phases of an action, a flexible endless picture carrier disposed between form defining surfaces, fluid pressure means for maintaining the picture bearing surface of said carrier in engagement with said form defining surfaces with portions of said carrier flexed away from the surface of presentation, and means for causing the propagation of the zone of picture flexures across the surface of presentation whereby one picture is substituted for another.

6. In an animated picture display device, a flexible endless picture carrier disposed between form defining surfaces in the form of a flattened loop, with the exterior surfaces of opposed walls of the loop in engagement with said defining surfaces, with the ends of said loop contiguous, and means for causing relative movement between said defining surfaces, whereby the carrier is propelled with the interior surface of the loop entirely free.

7. In an animated picture display device for presenting to direct view a series of pictures representing successive phases of an action, a flexible endless picture carrier disposed between form defining surfaces, fluid pressure means for maintaining the picture bearing surface of said carrier in engagement with said form defining surfaces with portions of said carrier flexed away from the surface of presentation, and means for causing relative movement between said form defining surfaces whereby the zone of picture flexures is shifted across the surface of presentation to substitute one picture for another while displaying in proper relation material complementary portions of both pictures.

8. In an animated picture display device, a flexible endless picture carrier disposed between form defining surfaces, and fluid pressure means for maintaining said carrier in the form of a flattened loop with exterior surfaces of its opposed walls in engagement with said defining surfaces, and with the ends of said loop contiguous, the entire interior surface of the loop being free.

9. In an animated picture display device, a flexible endless picture carrier disposed between form defining surfaces, fluid pressure means for maintaining said carrier in the form of a flattened loop with exterior surfaces of its opposed walls in engagement with said defining surfaces, and with the ends of said loop contiguous, the entire interior surface of the loop being free, whereby movement of one of the defining surfaces is adapted to shift the contiguous end portions of the loop along the carrier.

10. In an animated picture display device, a flexible picture carrier, fluid pressure means for maintaining the exterior surface of said carrier in engagement with a form defining surface, and means dependent upon the pressure of the fluid medium for automatically maintaining the carrier in a predetermined relation to its defining surface.

11. In an animated picture display device, a flexible picture carrier, and fluid pressure means for maintaining the exterior surface of said carrier in engagement with a form defining surface, a portion of the said defining surface being yieldable to permit the length of carrier in engagement therewith to automatically vary in accordance with the pressure of the fluid medium.

12. In a device for displaying animated pictures to direct view, the combination with a surface having the partial portrayal of a subject thereon, of a carrier having a series of portrayals thereon showing successive phases of an action, each carrier portrayal providing the missing portions of the subject portrayed on said surface, and means for presenting the portrayals on the carrier and on the surface in complementary relation, whereby the entire subject may be viewed as complete in its different phases.

13. In a device for displaying animated pictures to direct view, the combination with a surface having a partial portrayal of a subject thereon, of a carrier having a series of portrayals thereon illustrating successive phases of an action, each carrier portrayal providing the missing portions of the subject portrayed on said surface, with portions of the carrier portrayals showing successive phases of the action in complementary relation, and means for presenting the carrier with its portrayals in complementary relation to the surface portrayal, whereby the entire subject may be viewed with the portions portrayed on the carrier in apparent motion with respect to the surrounding stationary surface portrayal.

14. In an animated picture display device, a flexible carrier having a series of pictures thereon, means for maintaining the pictures on said carrier in engagement with a form defining surface, and means for automatically maintaining the effective perimeter of the form defining surface equal to a predetermined integral number of successive picture spacings measured along said carrier.

15. In an animated picture display device, a flexible carrier having a series of pictures thereon, means for maintaining a portion of said carrier in rolling enagagement with a closed surface defining the form in which the carrier is displayed, and means for automatically maintaining the effective length of the surface, with which said carrier is in engagement, equal to a predetermined number of successive picture spacings measured along the carrier.

Dated this fifteenth day of September, 1924.

JOHN T. BEECHLYN.